United States Patent [19]
Adam et al.

[11] Patent Number: 6,029,514
[45] Date of Patent: Feb. 29, 2000

[54] DEVICE FOR MEASURING THE VOLUME OF LIQUID IN A CONTAINER

[75] Inventors: Mordechai Adam, Haifa; Ben Zion Shisgal; Yosef Fashchik, both of Karmiel; Hanan Anderman, Haifa, all of Israel

[73] Assignee: Gintec Active Safety, Ltd., Karmiel, Israel

[21] Appl. No.: 09/138,337

[22] Filed: Aug. 21, 1998

[51] Int. Cl.[7] ...................................................... G01F 17/00
[52] U.S. Cl. ............................. 73/149; 73/290 R; 73/309
[58] Field of Search .................................. 73/149, 290 R, 73/305, 309, 310, 317, 319, 861.57, 296, 1.73

[56] References Cited

U.S. PATENT DOCUMENTS

| | | | |
|---|---|---|---|
| 3,153,931 | 10/1964 | Klemmetsen | 73/299 |
| 3,795,140 | 3/1974 | Nishihara | 73/309 |
| 4,813,275 | 3/1989 | Castor | 73/309 |
| 4,890,491 | 1/1990 | Vetter et al. | 73/290 |
| 5,157,968 | 10/1992 | Zfina | 73/309 |
| 5,315,873 | 5/1994 | Jin | 73/309 |

FOREIGN PATENT DOCUMENTS 37 16770  12/1988  Germany .

*Primary Examiner*—Hezron Williams
*Assistant Examiner*—Thuy Vinh Tran
*Attorney, Agent, or Firm*—Banner & Witcoff, Ltd.

[57] ABSTRACT

A device for measuring and monitoring the volume of liquid in a container comprises an adapter for mounting the device in an opening in the top wall of the container. The adapter supports a beam onto which one end of a float is connected such that the free end of the float extends substantially vertically into the container. A strain gauge is disposed on the beam so that the measuring direction of the gauge is parallel to the main axis of the beam. The device can also include a sensor for measuring physical parameters of the container. A processor is connected to the strain gauge and any sensor to take data from those input devices. During a calibration operation, a measurement function is derived to correlate strain gauge readings to the volume of liquid in the container. The function is recorded in a processor which takes data from the strain gauge and calculates the actual volume of liquid in the container. An output component displays the measurement. The device of the present invention can be used in new containers and easily retrofitted to existing ones since the internal shape of the container is expressed in the measurement function.

19 Claims, 11 Drawing Sheets

DEVICE FOR MEASURING THE VOLUME OF LIQUID IN A CONTAINER

FIELD OF THE INVENTION

The present invention relates to a device for measuring and continuously monitoring the amount of liquid in a tank while compensating for factors such as the shape of the tank and physical variances.

BACKGROUND OF THE INVENTION

Several methods for measuring the amount or volume of liquid contained in receptacles are in use today. Measuring the volume can be implemented in a simple way by comparing the level of the liquid to a static gauge fixed against a vertical wall of the container or against a vertical transparent gauge connected to the container and visible from the outside.

More sophisticated methods take into consideration the tendency of liquids to occupy the lowest available spaces and flatly level in a container in which they are confined. Such prior devices employ a float which is connected mechanically to a variable electric resistor, whereupon the change in the liquid level of the resistance is expressed in an appropriate electronic circuit. Other methods of detecting the level of liquid exist which utilize physical phenomena involving energy distribution such as conduction of heat and propagation of electromagnetic and mechanical waves.

German Patent Application 37 16 770 A1 discloses a device comprising a fixed pillar, flexible beam with a strain gauge, vertical float and a spacer link connected together in a trapezoid configuration to assess the liquid level in a tank. The pillar is affixed to the container, and the lower end of the float is attached to the pillar via the spacer link. The spacer link retains the float at a constant distance from the pillar, and also corrects the reading of the volume by inclination of the container. The upper end of the float is connected to a flexible beam carrying a strain gauge. Connecting the base of the float to the pillar introduces an element of error in the reading particularly when the container is tilted or in motion. Lateral forces transmitted toward the pillar are not accounted for. In addition, the float described in the patent is vulnerable to strong movement of liquid during vehicle movement such as inclination, vibration, or brake activation. Further, additional parts connected to the float such as a central fixed pillar, the spacer link and a bearing piece present complications for the correct functioning of the device. Moreover, the device is, relative to the container, very large and special skills are needed for mounting such a complex structure. Practically, there is no way to put such a device in an already existing tank.

The device employs electronic circuits in measuring devices to enable the transmission of measuring information to remote locations. These circuits have stored information as well as facilitated calculations involving quantities of liquid and changes in the quantity.

In general, measuring liquids in tanks can be a complicated task when the container has an irregular shape, or when the tank is subject to movement or variable positions such as during transport or while resting on an incline. These variances often result in liquid measurements which are inaccurate, particularly those that rely on the level of liquid in the tank to produce a measurement of volume.

The problems associated with the measurement of the fuel status in the vehicle tank are related to the reliability of existing systems to the functional requirements such as precise measurement. Most existing systems are only able to indicate an approximate quantity of fuel in the tank. In addition, the system must function when the vehicle is parked or in any static condition, and while the engine is running, and whether the vehicle is loaded or unloaded. In general problems arise in existing systems when movement of the fuel surface is caused by the engine running, during fuel replenishment, vehicle movement on a rough road, truck inclination or brake activation and other physical variances.

There has been a need therefore, for a device which provides a precise measurement and continuous monitoring of the amount of liquid in a tank regardless of the shape of the tank, its position or operating conditions of the vehicle. Further, there is a need for such a device to be capable of use with new tanks as well as being retrofit into existing tanks.

SUMMARY OF THE INVENTION

An object of the present invention is to provide a device for measuring and monitoring the amount of liquid in a tank. The benefits of the invention over prior systems is the continuous monitoring of the fuel tank which allows: measurement of the fuel consumption; detection of fuel theft from the tank; detection of an unforeseen leak of the fuel tank; and independent and controllable measurement of fuel replenishment. The device of the present invention comprises a submerged float held substantially vertically in the tank. The vertically disposed float is retained on a horizontal beam, with a strain gauge disposed on the beam so that the measuring direction of the gauge is parallel to the main axis of the beam. The device also includes a sensor for measuring physical parameters of the tank, and a processor connected to the strain gauge and sensor.

This device provides accurate measurement of the volume of liquid in a tank regardless of the shape of the tank, and can be readily applied to new tanks or vehicles as well as retrofitted to existing tanks or vehicles. This is accomplished by a calibration process which derives a function correlating the amount of liquid to strain gauge readings so that the specific shape and any irregularities of the tank are explained by or subsumed in the function. The calibration process can be carried out by adding very small amounts of liquid in order to derive a function that can account for very fine measurements. Once the device is calibrated, this is a real time measurement device that continually monitors the amount of liquid in the tank.

Another object of the invention is to encompass different ways of calibrating tanks applying the principles of the invention. One way would be to develop an algorithm for the calibration of a prototype tank of a standard or simple shape with the sensor at a pre-determined location in the prototype tank. The algorithm can then be used for all identical tanks produced based on the prototype. It would be a matter of outfitting the production tanks with the pre-programmed algorithm. In addition, the principles of the present invention can be applied to develop an algorithm for calibrating tanks with complex shapes with a solid modeling program. Such a program would assign a correct value derived from a sensor reading at various amounts and inclinations.

A further object of the present invention is to provide a method for measuring the quantity of liquid in a tank, the method comprising the steps of collecting a first set of data from a strain gauge which measures a function of the buoyancy of the float; collecting a second set of data from a sensor for measuring the physical parameters of the tank, and the contents thereof; using the second data set to formulate a function which correlates the strain gauge readings to the physical parameters.

The device is a stand alone unit which may be installed in any fuel tank, regardless of its shape and geometrical dimensions. The mounting is made through an opening in the top of the tank. If the measuring system is installed in the geometrical center of the tank, the tank's position will have no impact on the liquid level reading. The device, however, provides compensation for position variations, via an inclinometer, allowing a volume reading for possible inclination of the tank.

The device measures the volume of any liquid placed in a container using a buoy or float connected directly to a sensor. The sensor measures the strain exerted by floatation of the float. The sensor is a measuring device which generates electrical signals proportional to the floatation force exerted by the float, and therefore the volume of the liquid. The device has a solid construction with no moving parts. Because of the simplicity of the invention based on well known principles, the present system assures high sensitivity, stability and reliability.

The system can be adapted to any type of container and no special preparation is necessary if the device is installed directly through an opening on the top of the tank. In addition, the device of the present invention provides: versatility regarding container volumes, shapes and types of fluids; stability at different measurement conditions; enhanced precision and sensitivity; reliability and safety.

DETAILED DESCRIPTION OF THE PREFERRED EMBODIMENT

Figure 1:
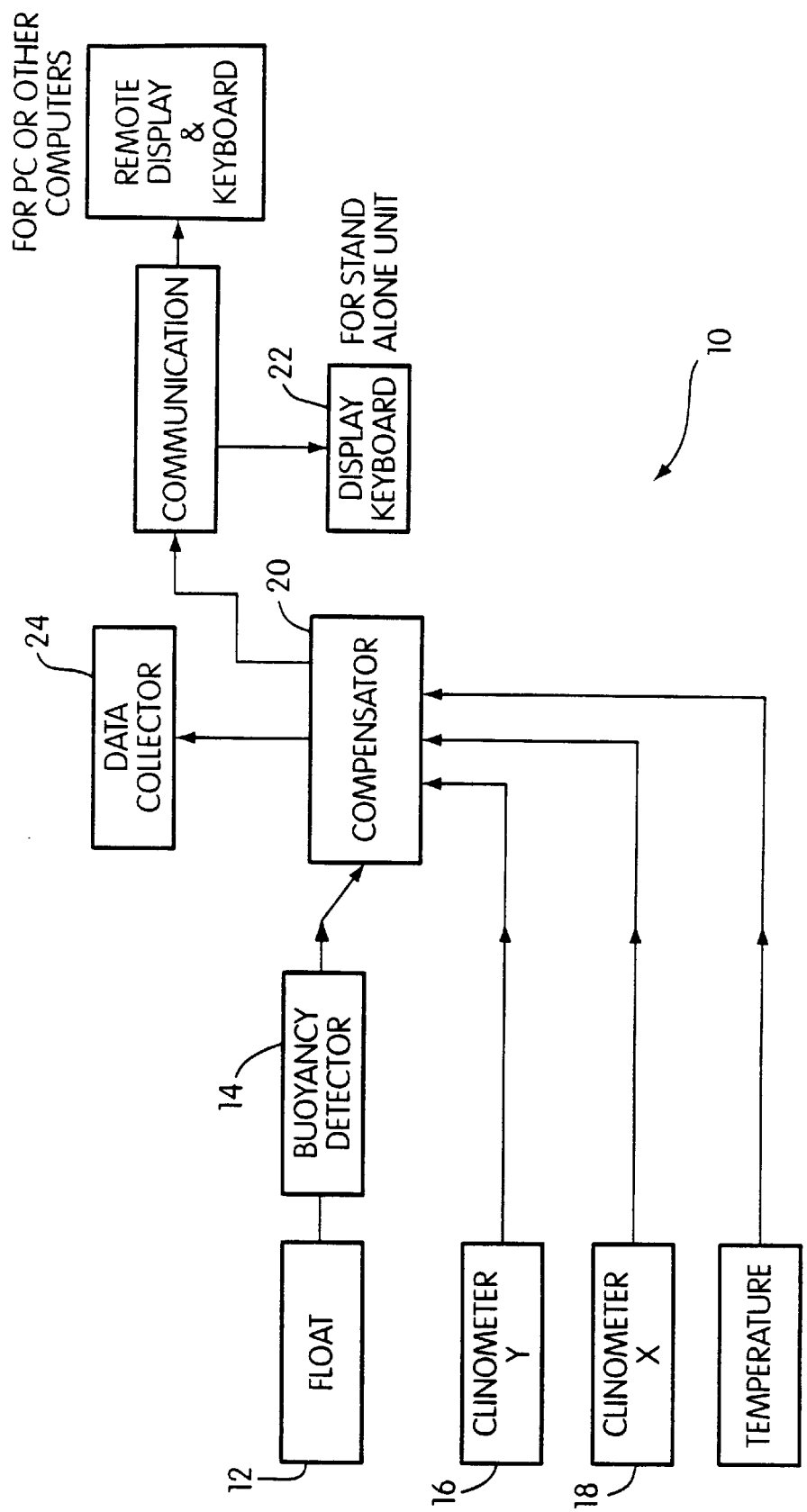
FIG. 1 is a block diagram of a device for measuring and monitoring the amount of liquid in a tank in accordance with the present invention.

Referring to FIGS. 1–8, the liquid measuring and monitoring device 10 of the present invention comprises components disposed in a tank T which are interconnected together in a processing unit which outputs a measurement on a display. The preferred embodiment of the present invention is directed to mobile tanks such as mounted on vehicles for retaining fuel, but the principles could be applied to any type of tank in which reliable measurement and monitoring of the amount of fluid is desired. The word tank is used throughout the specification and is intended to encompass a variety of receptacles. Similarly, the word fuel is used in the specification interchangeably with fluid and liquid and is intended to encompass fluids retained in a receptacle.

Broadly, measuring and monitoring device 10 can be installed under a cap (not shown) for a tank opening, or otherwise mounted on an upper wall 11 of a tank. The components of the device include a float 12, a buoyancy detector 14, physical parameter detectors 16, 17, 18, a compensator 20, a communication device 21, a first output device 22, a second output device 23 and a data collector 24. Physical parameter detectors may include clinometers measuring for inclination of the tank in two axes and a thermometer as explained herein. The first output device is preferably a display or keyboard for a stand alone device, and the second output device is a remote display or lead to a computer as part of a monitoring system. Depending on the application, a second output device may or may not be needed. Device 10 measures and monitors the amount or volume of liquid in a tank after initial calibration, and is capable of providing reliable measurements regardless of the shape of the tank or physical variances such as whether the tank is inclined or in motion.

The basic operation of the device is explained by the flotation of the float in the tank exerting a buoyancy force on the buoyancy detector 14. The float is submerged in the liquid in the tank, and in the preferred embodiment, buoyancy detector 14 is a strain gauge transducer mounted on a beam which transduces the buoyancy force exerted by the float into volts and outputs a digitized reading of the force or strain to the processing unit. The processing unit performs a calculation based on a function derived during an initial calibration operation, and outputs a value corresponding to the amount of liquid in the tank. Further, the processing unit can perform compensating calculations based on additional functions derived during calibration operations which compensate for physical variances such as, for example, an angle of inclination of the tank relative to a preset horizontal axis.

Figure 2:
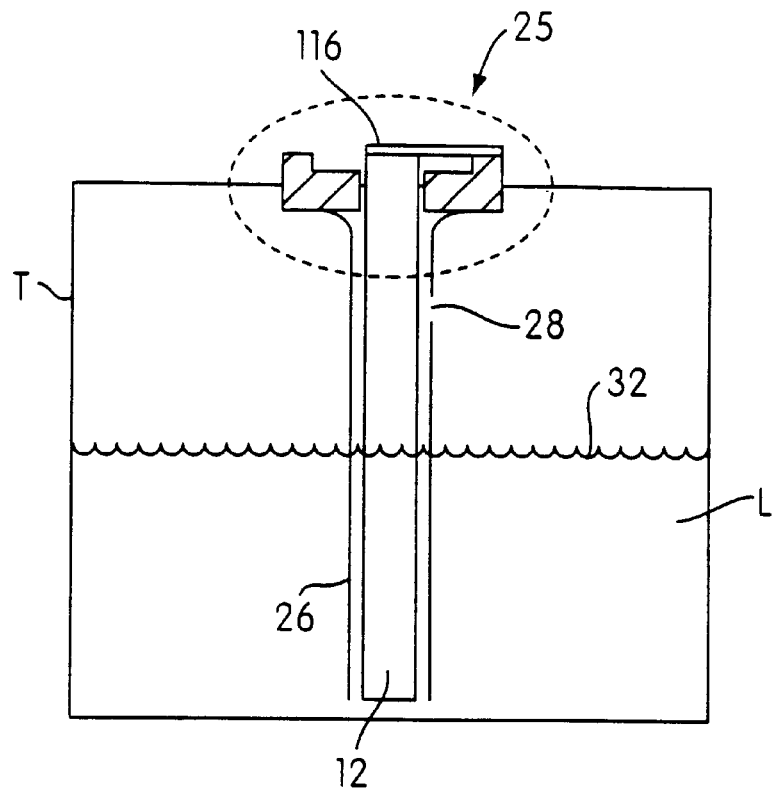
FIG. 2 is a schematic representation of the device shown in a tank.
Figure 3:
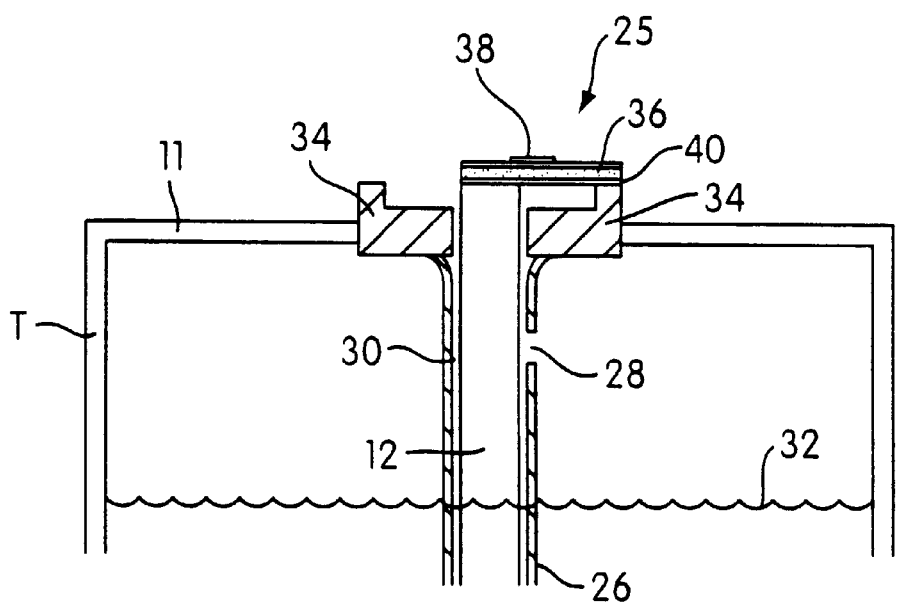
FIG. 3 is a detailed view of the device of FIG. 2.
Figure 4:
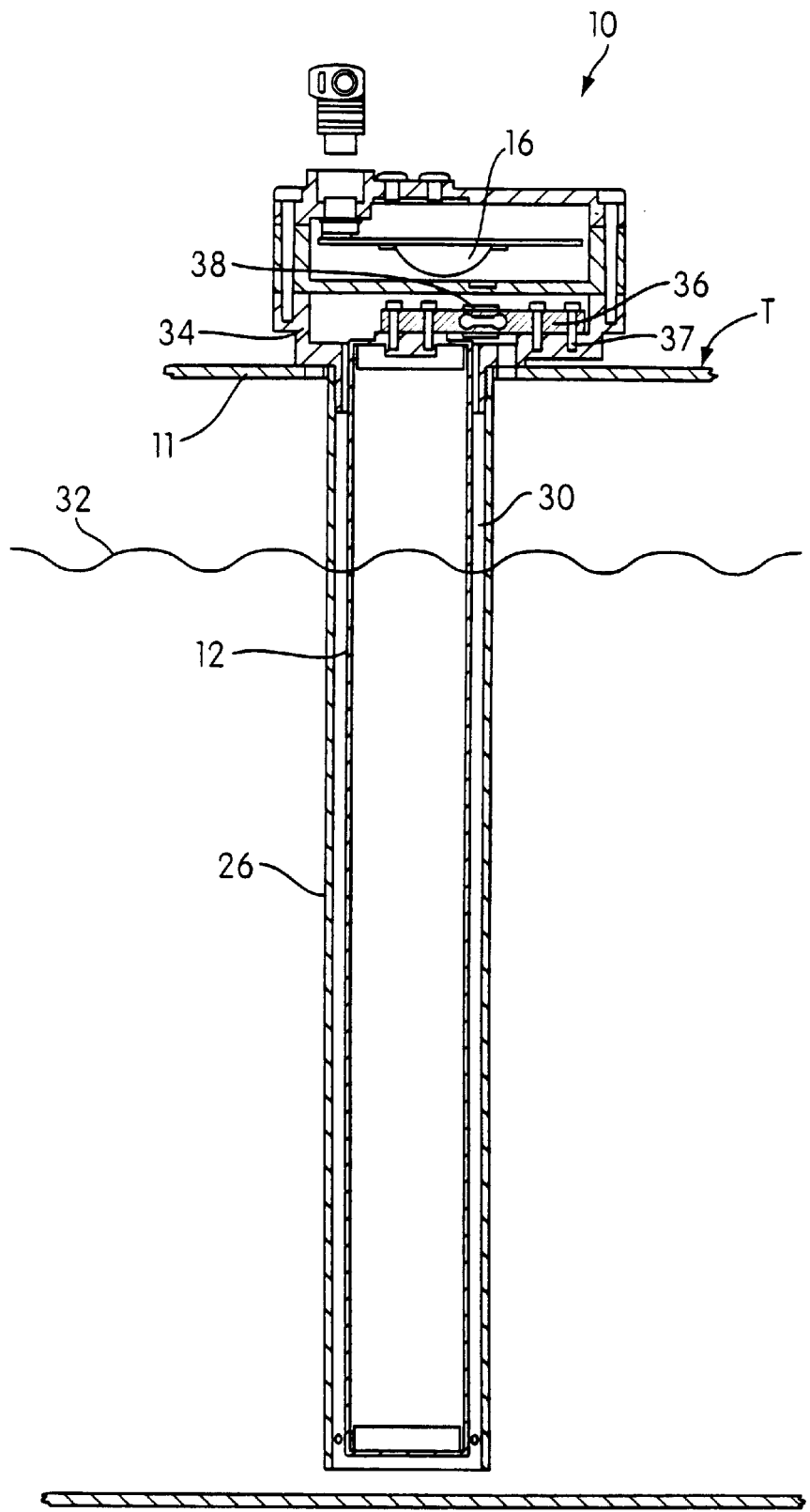
FIG. 4 is a side elevational view of the components of the measuring and monitoring device.
Figure 5:
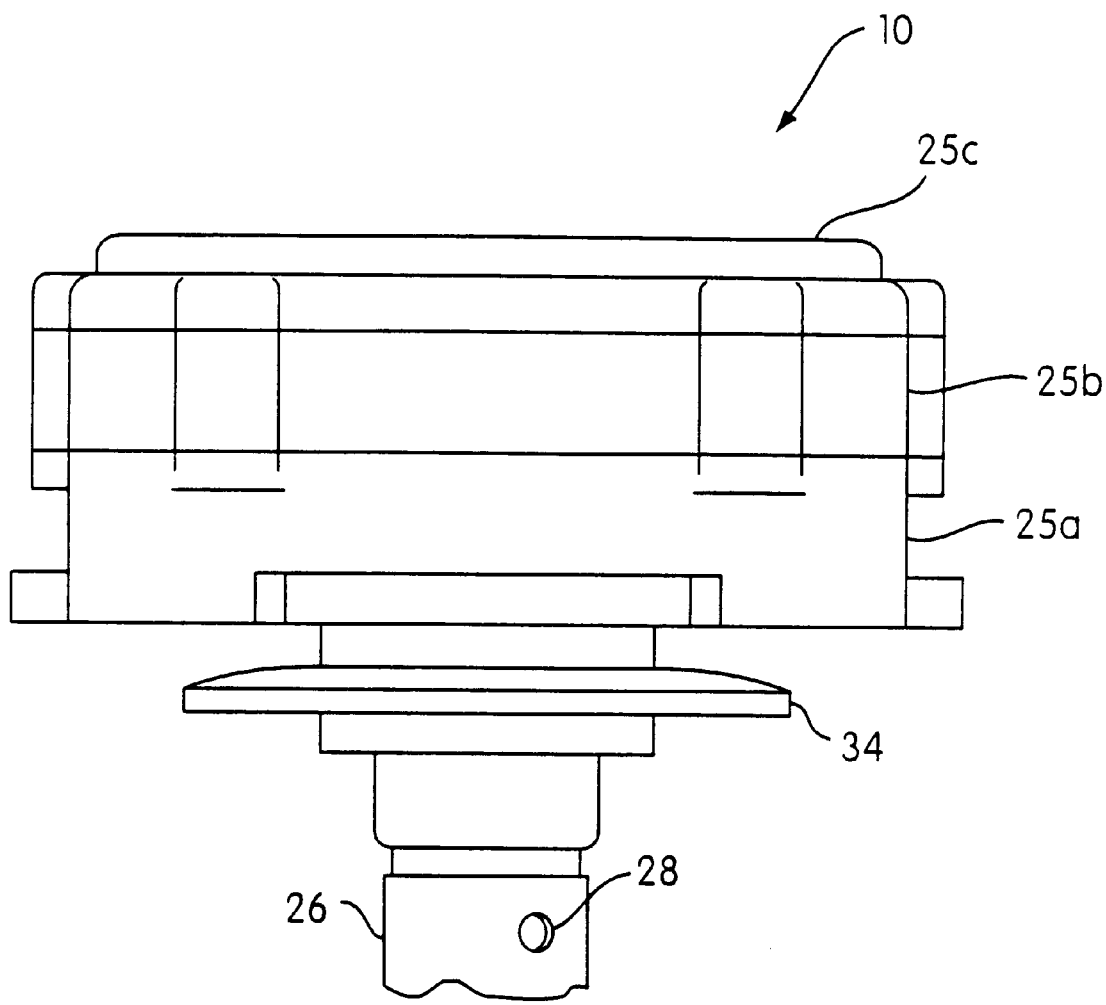
FIG. 5 is a side elevational view of the top portion of the device.
Figure 6:
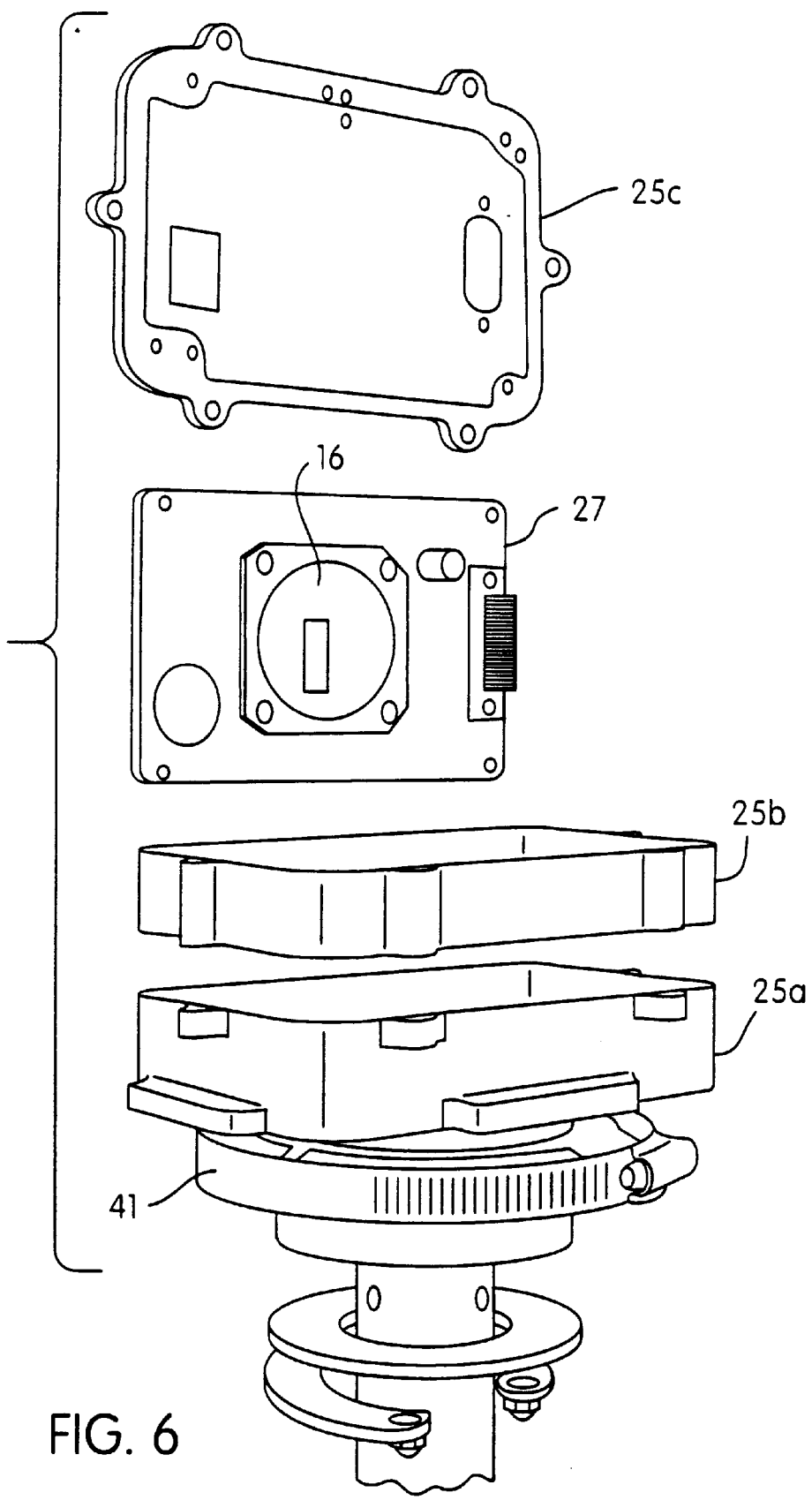
FIG. 6 is an exploded assembly view of the device of FIG. 5.

The components of device 10 are shown schematically in FIGS. 2 and 3, and in elevational view in FIG. 4. Device 10 comprises float 12 held substantially vertical by a support assembly 25 inserted into an opening in a tank T. The bottom part of float 12 is submerged in liquid L, and protected against turbulent movement of the liquid by protective jacket 26. Liquid L fills the space between jacket 26 and float 12. A vent 28 in the jacket facilitates free exchange of gases between the tank and space 30 inside the jacket to equalize the pressures, so that the level 32 of liquid is the same both inside and outside of the jacket.

Float 12 and cover 26 are arranged to extend into the tank so that their ends are within a few millimeters from a tank bottom wall 33. The float and cover are preferably cylindrical in shape so that the float is concentrically disposed within the cover as seen in the figures. Cover 26 mechanically protects float 12 from violent movements of the fluid during vehicle movement such as inclination, vibration or braking, but is also allows free movement of the liquid within the cover. An additional purpose of cover 26 is to regulate the flow of the liquid in the space between the float and cover to prevent erratic readings of the volume during tank agitation. The clearance between the float and cover is a design consideration which can be adjusted according to the viscosity of the liquid. For instance, the viscosity of gasoline is almost ten times lower than that of kerosene.

More specifically, float 12 is preferably a hermetically closed, light-weight cylinder, and its volume is adapted to the full scale capacity of the measuring device. The float and cover are preferably made from passivated aluminum, so there is no interaction of any kind with the fluid. It has been found that the weight of the float, or inner cylinder, has little influence on the measurement of data during vehicle vibrations. In the illustrated embodiment, the concentrically related float and jacket are circular cylinders, but could take other shapes.

Figure 7:
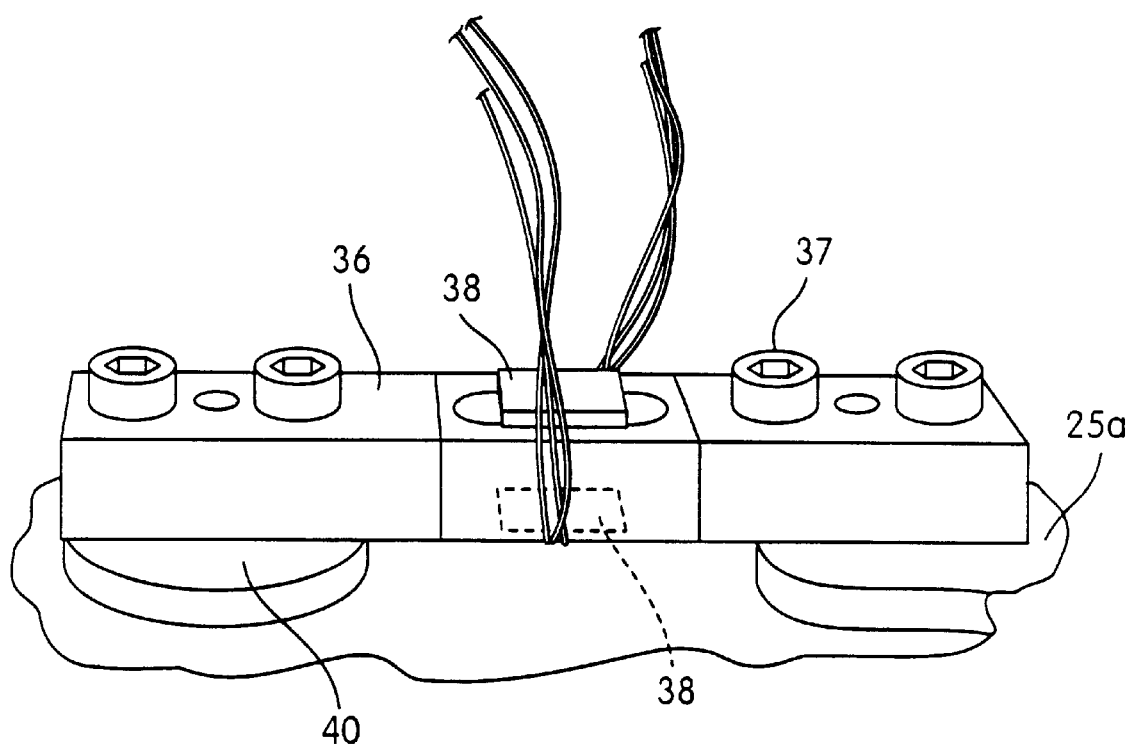
FIG. 7 is a perspective view of the beam and buoyancy detectors of the device of FIG. 5, shown assembled in the device.

With float 12 sheathed in protective jacket 26, the float and jacket assembly are mounted by support assembly 25 at an upper tank wall 11. Support assembly 25 comprises a mounting adapter 34 which is preferably disc-shaped and mounted within a tank opening. Support assembly 25 comprises three elements 25a, 25b and 25c which assemble together to house the inner components of the device. Upper support elements 25b and 25c defines a chamber which houses the electronic components and a printed circuit board 27. An electrical connector 29 is provided in support assembly 25 to link the device to an external power source, a remote control or remote output. The lower element 25a which is adjacent mounting adapter 34 supports therein a horizontally disposed beam 36, preferably aluminum, which extends over the center of the opening of the tank in cantilevered fashion as best seen in FIG. 7. Beam 36 is mounted via mounting screws 37 to support element 25a at one end and to an attachment plate 40 at the other, FIG. 7. The top of float 12 is seen in FIG. 7. Float 12 is attached to beam 36 by an attachment plate 40. Attachment plate 40 is also connected to a top seal 13 onto which the top of float 12 is attached by crimping. Surrounding top seal 13 is a flexible seal 15 which is a thin wall of fuel resistant membrane that seals the beam configuration housed in support element 25a from direct contact with the fuel. In the preferred embodiment, flexible seal 15 is made of neoprene.

Figure 8:
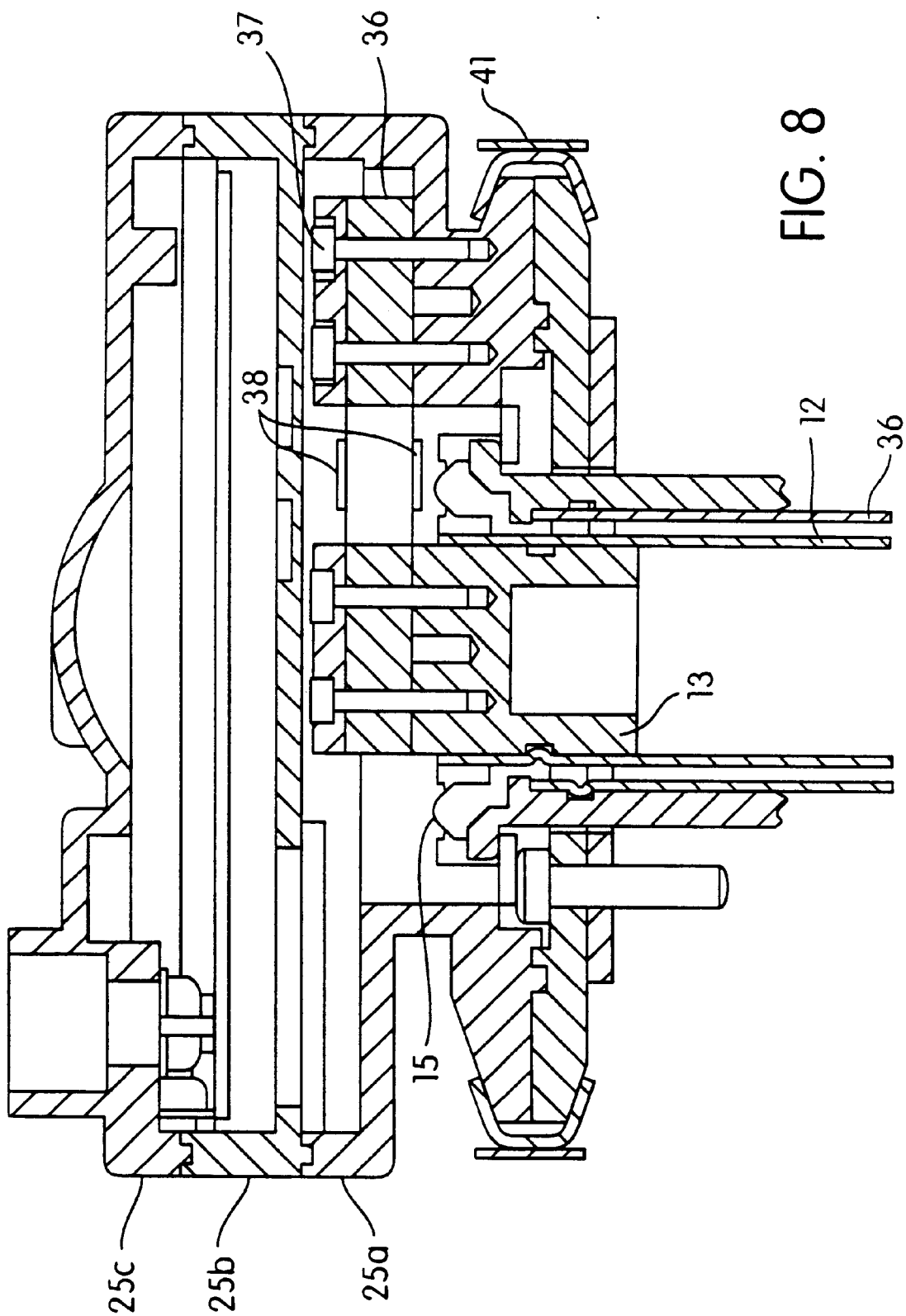
FIG. 8 is a schematic sectional view of the device of FIG. 5.

A set of strain gauges 38 are mounted on beam 36. The combination of flexible beam 36 and the strain gauges 38 is referred to as buoyancy detector 14. As the liquid level 32 changes, float 12 will press upward on beam 36. Strain gauges 38 transduce the upward force exerted by float 12 on beam 36 as a change in resistivity in volts. In the preferred embodiment, an "S"-type beam is used with two full bridge strain gauges disposed on opposite sides of the beam. An S-type beam refers to the shape to which the flat beam flexes when pressure is applied. With this beam configuration, when complex forces are exerted, all of the vertical forces are summed up and the opposing signs of the two strain gauges offset the remaining lateral and torsional forces. In this manner, any need to support the float along its length is eliminated since all torsional forces offset one another. As seen in FIGS. 7 and 8, strain gauges 38 are mounted to opposite sides of beam 36, and the wiring from the strain gauges is directed toward the electronics chamber defined within upper support element 25c.

Strain gauges are reliable and widely used for measuring various mechanical parameters. Strain gauges provide accurate readings and their outputs can be readily incorporated into electronic circuits and systems. A strain gauge provides a more precise measurement sensitivity, a tolerance of 0.1% which is far better than the generally accepted tolerance for fuel tank gauges.

Figure 9:
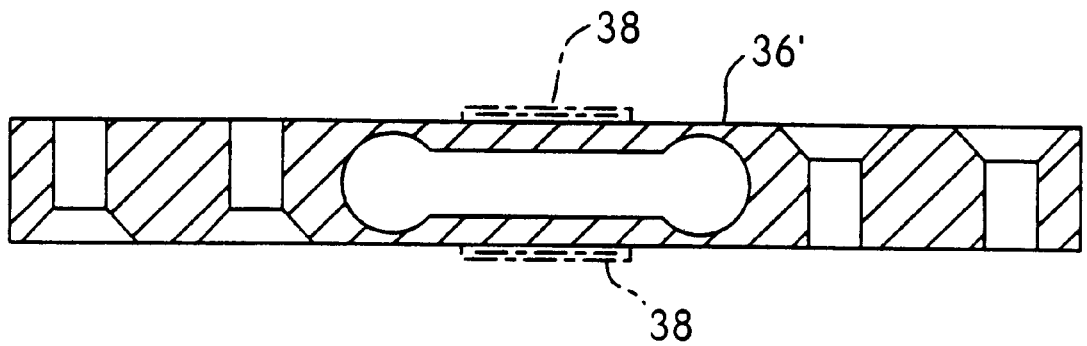
FIG. 9 is a sectional side view of an alternative beam for the device of FIG. 5.
Figure 10:
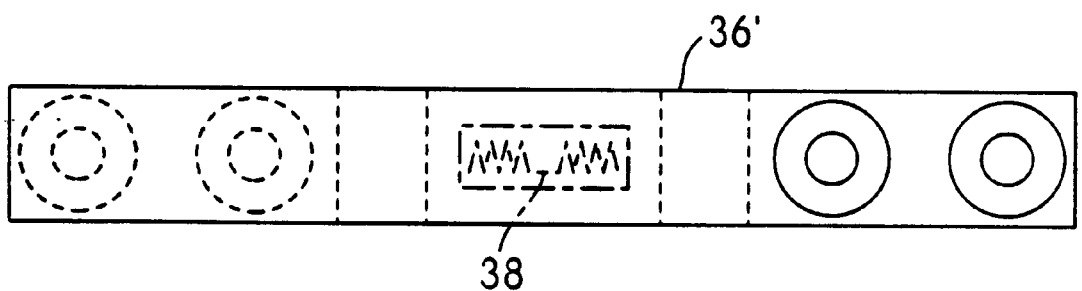
FIG. 10 is a top plan view of the beam of FIG. 9.

An alternative configuration of the beam and strain gauges is shown in FIGS. 9 and 10 in which beam 36' has a specific cross section in the central area where strain gauges 38 are mounted on opposite sides. The holes for the mounting screws are tapped so that the mounting screws on opposite sides of the central area are directed in opposed directions. The operation of the beam and strain gauges is the same as that for the embodiment of FIGS. 1–8.

Figure 11:
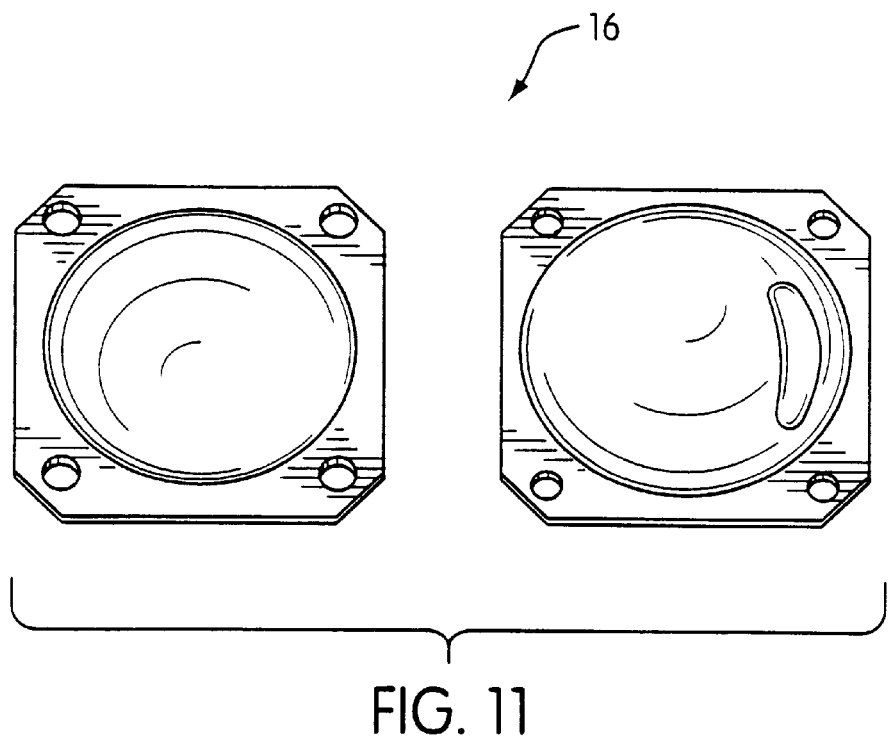
FIG. 11 is a top plan view of an unassembled inclinometer for the device of FIG. 5.
Figure 12:
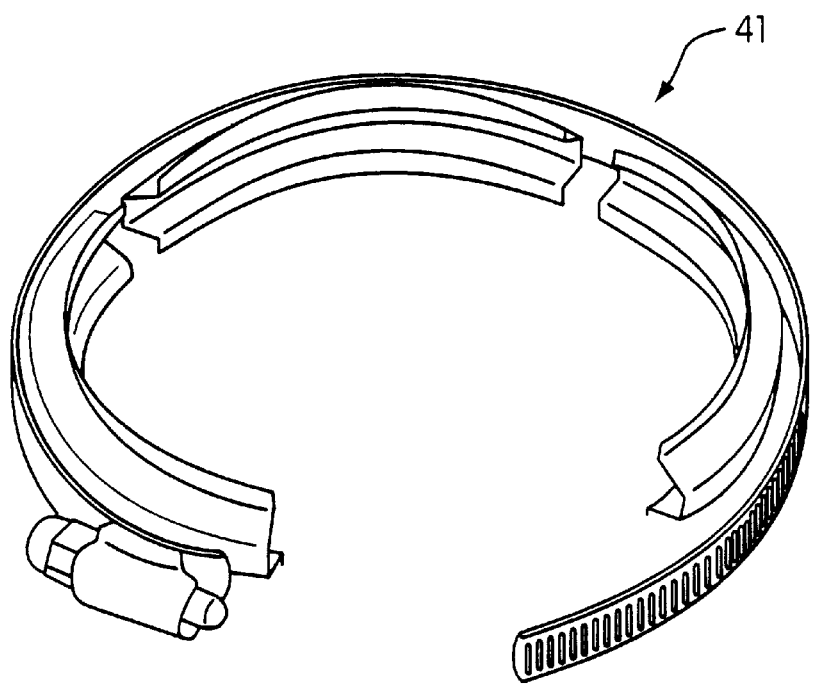
FIG. 12 is a top view of the peripheral clamp shown in FIG. 6.

Referring now to FIGS. 11 and 12, two more components of the device are illustrated in detail. Two pieces of a disassembled clinometer 16 is shown in FIG. 11 in which the top of the hemispherical portion is shown along side the mating portion. The assembled clinometer is mounted to card 27 and connected to the processing unit which performs a compensating function derived during calibration operations to account for incline of the tank for example. The clinometer dome may be positioned convexly or concavely with respect to the card for purposes of this device, and measures both in the tilt and yaw axes.

The device is secured to mounting adapter 34 by a peripheral clamp 41 which extends around the entire mounting adapter. The clamp is adjustable and securely maintains the device on the mounting adapter.

Figure 13:
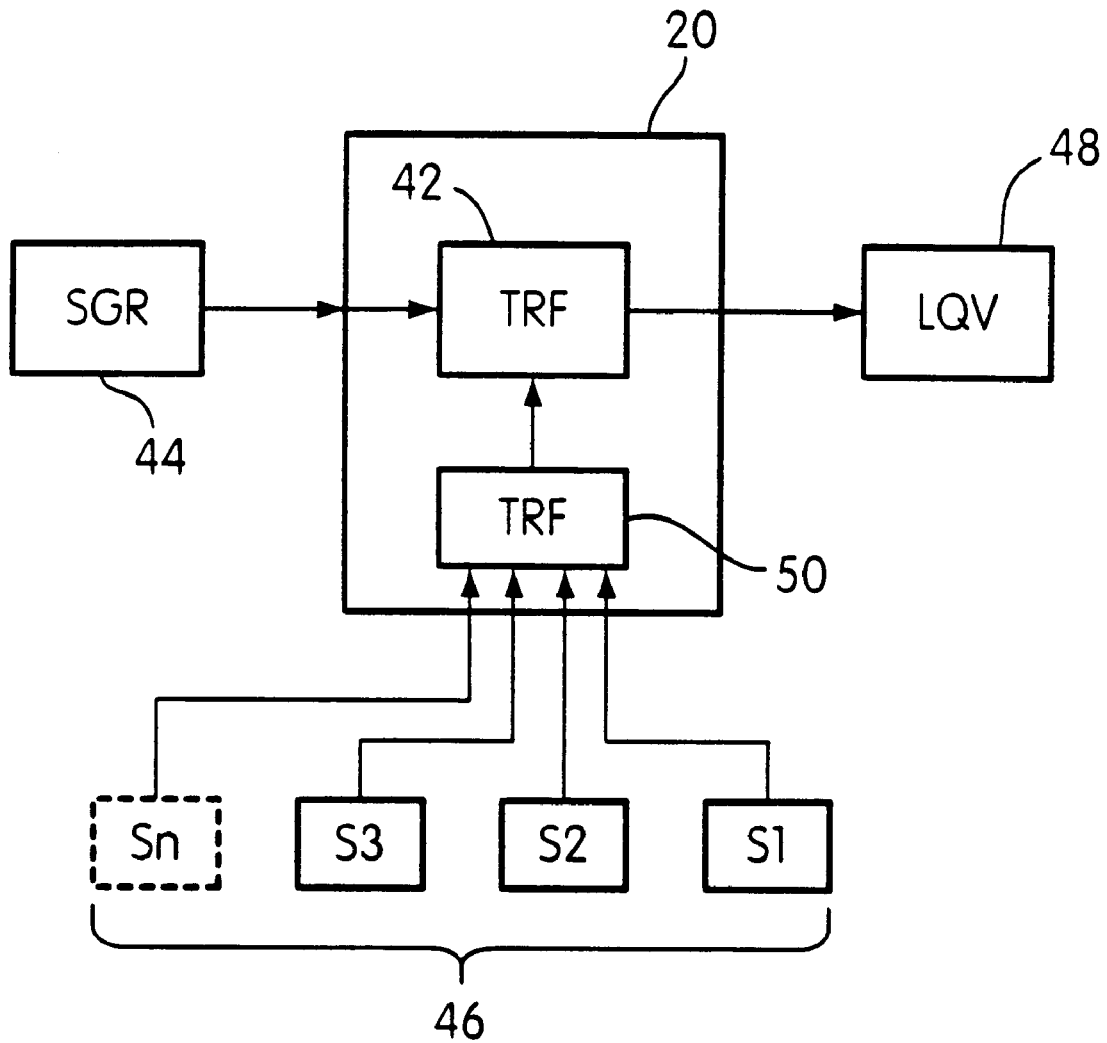
FIG. 13 is a block diagram showing the interconnection of the components in the device.

Reference is now made to FIG. 13 which is a block diagram of the logical components of the processing unit of device 10. Compensator 20 comprises a transducing function (TRY) unit 42 which strain gauge readings (SGR) 44, and physical parameter data from various sensors 46. The output of compensator 20 is a liquid value (LQV) readout 48. In compensator 20, transducing function unit 42 is controlled by control unit 50 which is a transduction function adaptor (TRFA), and performs transduction functions on physical parameters detected by sensors 46.

Thus, the strain gauge readings constitute input data for the transduction function 42. Also provided in the compensator, but not shown, are appropriate circuitry to average out noise and small fluctuations such that for each such averaged strain gauge reading, a resultant quantity of liquid is provided by readout 48.

According to a preferred embodiment of the invention, two of the sensors 46, $s_1$ and $s_2$ are preferably dual axis clinometers and correspond to physical parameter detectors 16 and 18 in FIG. 1. These clinometers are disposed horizontally and mutually orthogonally such that inclinations of the tank are detected. The clinometers are preferably capacitance based sensors which produce output signals proportional to the relative tilt in two axes. Such inclinations of the tank are common when the tank is mounted on a vehicle, especially traveling on hilly or bumpy terrain. The output signals collected from the clinometers are provided to the transduction function adapter unit 50 which adjusts the transduction function in accordance with the degree of inclination.

Figure 14:
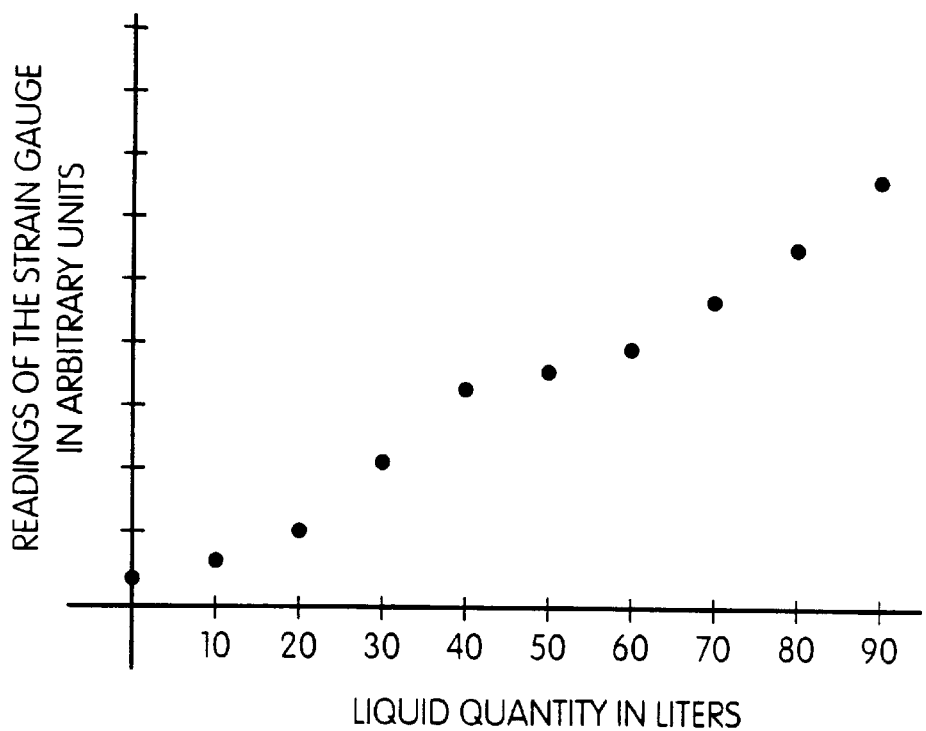
FIG. 14 is a plot of amount of liquid in a tank versus readings of a strain gauge in an exemplary calibration of the device.

In order to achieve an accurate correlation between the readings obtained by the strain gauge and the actual quantity of liquid in the tank, the device must be calibrated before first use. A correlation function between the amount of liquid in the tank and the corresponding strain registered on the strain gauge is derived by an initial calibration operation. This correlation function is a mathematical explanation of the shape of the tank. It represents the empirical relationship between a specific liquid and quantity in a specific tank. The initial calibration operation begins with an empty tank and the measuring device in place. A known quantity of liquid is added incrementally to the tank and strain gauge readings are taken after each addition, so that a strain gauge reading corresponds to a known quantity of liquid. The strain gauge vs. liquid quantity data points are plotted on a calibration graph as shown in FIG. 14. A correlation function is derived from the empirical plot of FIG. 14, and subsequently recorded into transduction function unit 42. For a highly irregular shape of tank, an initial calibration operation may require a denser point distribution in order for the calibration graph to be sufficiently accurate. That is, smaller amounts of liquid would be added to obtain finer strain gauge differentials. The correlation function derived by an initial calibration operation is usable for all identical tanks. Because derivation of a correlation function in this manner is a relatively simple operation, the measuring and monitoring device of the present invention is suitable for retrofitting to existing tanks, as well as use in new tanks.

Figure 15:
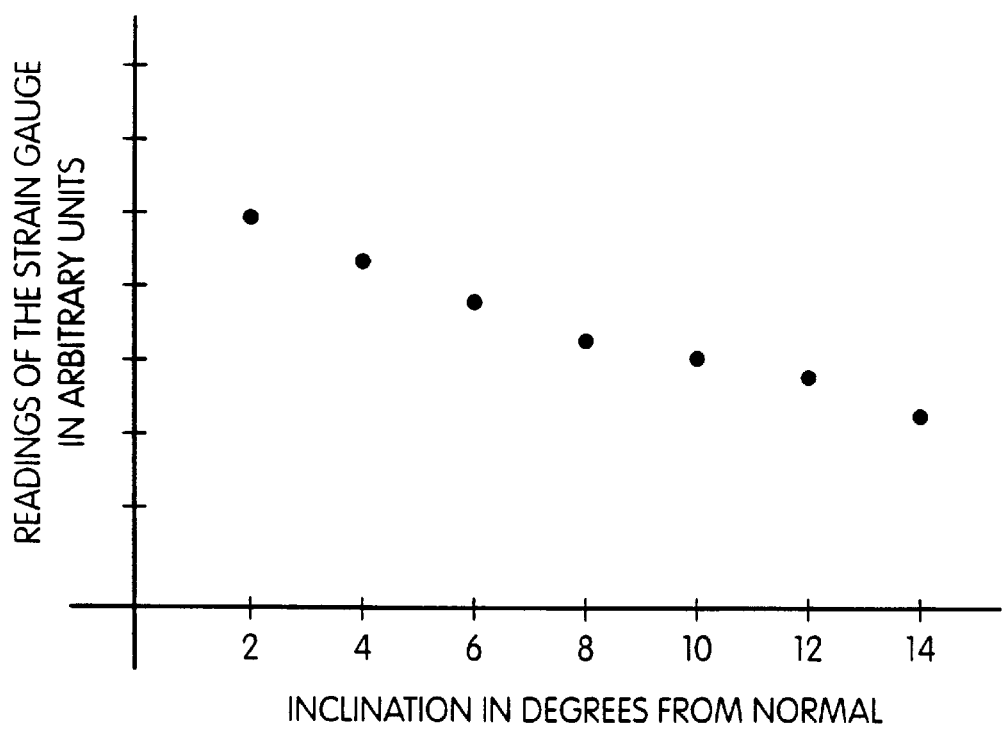
FIG. 15 is a plot of physical variance of the tank for a given amount of liquid versus readings of a strain gauge in an exemplary calibration of the device.

Compensation functions which correlate a physical parameter, such as inclination, to strain gauge readings are also derived empirically. For example, an inclination compensation function would be derived by starting with the tank filled with a known quantity of liquid. Keeping the amount of liquid fixed and the measuring device in place, the tank is inclined in angular increments from a preset axis, called normal, and strain gauge readings are taken at every angular incline, so that a strain gauge reading corresponds to a known tilt or incline. The strain gauge vs. inclination in degrees (from normal) are plotted on a graph as shown in FIG. 15. A compensation function is derived from the empirical plot of FIG. 15, and subsequently recorded into transduction function adapter unit 50.

The compensation function is applied to data detected by the sensors 46 and the result is, in turn, a factor in the main transduction function 42 so that the reading in display 48 accurately reflects the amount of liquid in the tank, as measured by strain gauge and corrected by the calibration function, and compensates for any physical factors such as incline as measured by a clinometer and its compensation function. Also, as explained above, an averaging algorithm is also used so that the display of fuel volume will not be effected by sudden movements of the fuel within the tank.

Another compensation function which may be derived and applied is one for temperature for a given amount of liquid. The temperature measured would be the difference between the exterior temperature and the interior temperature of the tank. This temperature is, generally, linear. Compensating for temperature may be necessary in cold climates in which a heating device is used to ensure free flow of fuel from the tank to the engine to maintain a proper viscosity of the fuel. The temperature rise due to the heating device may cause expansion of the volume of liquid without an actual change in the amount. Thus, in certain applications, a temperature compensating function may be applied. Any thermometers associated with such usage are disposed outside of the fuel tank, with at most, a probe in a component located within the tank.

Any number of compensation functions are possible to account for different physical factors. For applications such as stationary tanks, it is also possible that no physical variance sensors or compensation functions would be used.

A device of the present invention was tested using a special road simulator which simulated the field performance of the device. The testing yielded empirical data which was used to derive the transduction function and a compensation function for inclination. It was found through extensive testing that the device provides accurate measurements and that long term performance with reliable repeatability is assured.

The simulator comprised a 350-liter tank allowing for continuous monitoring of the liquid volume in a dynamic mode, with tilt and roll movements and the simulation of sudden stops. In the example, the volume of float 12 is approximately 1000 ml, resulting in a force of levitation equivalent to one kg when calculated for water. This force acts directly on the strain gauge which is produced for 1 kg full scale. Algorithms for converting strain gauge readings of differently sized and shaped tanks into volumetric measurements were developed with at least 1% specific accuracy. A dual axis clinometer was used to achieve a full compensation for bi-axial inclination and tilting of the tank. The data shown in FIGS. 14 and 15 were taken from tests of the simulator.

The calibration of the device can be achieved in a number of ways apart from the calibration procedure disclosed herein. For instance, an algorithm for the calibration of tanks of standard or simple shapes with the sensor at a predetermined location can be developed so that all tanks for which calibration functions have been developed can simply be outfitted with a pre-programmed algorithm. In addition, an algorithm for calibrating tanks with complex shapes can be determined with a solid modeling program which can assign a correct value derived from a sensor reading at various amounts and inclinations. The calibration method disclosed herein is an exemplary one to develop an appropriate algorithm, but is not the exclusive means to calibrate the device claimed herein.

The measuring and monitoring device of the present invention presents many advantages over the prior art. Among the advantages are improved safety features. The device is explosion proof as there is no voltage supply inside of the tank, nor to the strain gauge which may be mounted under a cap of the tank. No materials which may cause hazardous static electricity are used. Furthermore, no electric or electronic devices are used inside of the tank as in some prior art devices.

In addition, optional safety features may also be provided on the device. The processing unit can be programmed so that sudden changes in fuel volume as can be caused by theft, are detected and trigger an audible alarm or visual indicator. A similar alarm or indicator may warn of an unusually fast loss of fuel in the tank such as would be caused by a leak.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited only by the claims appended hereto.

We claim:

1. A device for measuring and monitoring the volume of a liquid in a container mounted in a movable vehicle, said device comprising:

a mounting adapter for mounting said device in a top wall of the container;

a beam attached to said adapter;

a pair of strain gauges disposed on said beam;

a longitudinal buoyant element with one end affixed to said beam and a free end extending into the container, said buoyant element adapted to be partially submerged in a liquid in the container such that upward and downward movement of said buoyant element registers on said strain gauges as corresponding strain measurements, said strain gauges disposed on said beam and relative to one another to offset torsional and lateral forces on said buoyant element due to movement of the liquid in the container;

a processor coupled to said strain gauges for correlating strain measurements by said strain gauges to the volume of liquid in the container; and an output component coupled to said processor for indicating the measured volume of liquid in the container.

2. The device of claim 1, further comprising:

a sensor for detecting a physical variance of the container, said sensor coupled to said processor, wherein said processor comprises a compensator for compensating the measured volume for any physical variance of the container.

3. The device of claim 2, wherein said sensor comprises a clinometer for detecting changes in inclination.

4. The device of claim 1, further comprising:

a protective jacket covering at least a submerged portion of said bouyant element to protect said float from turbulent movement of the liquid in the container.

5. The device of claim 4, wherein said protective jacket is attached to said adapter and extends around said float in a concentric manner.

6. The device of claim 5, wherein said float and said protective jacket have a cylindrical configuration.

7. The device of claim 1, wherein said beam is an S-type beam.

8. The device of claim 7, wherein said strain gauges are mounted on opposite sides of said beam so as to detect vertical forces exerted on said buoyant element and to offset torsional and lateral forces.

9. A method of measuring the volume of liquid in a container of unknown shape and capacity, the method comprising the steps of:

calibrating strain gauge readings to correspond to the buoyancy force of a float partially submerged in liquid and operatively coupled a processor, said calibrating step comprising the steps of iteratively adding a known volume of liquid beginning with an empty container, collecting calibration data from strain gauge readings which correspond to measure the buoyancy of the float after each addition of a known quantity of liquid and storing the data, and deriving a measurement function from the calibration data to correlate strain gauge readings to the volume of liquid in the container;

after calibration, iteratively collecting a data from a strain gauge which provides a measure of the buoyancy of a float and calculating a value representing the volume of liquid in the container using the measurement function.

10. The method of claim 9, further comprising the step of:

collecting a second set of data from a sensor which provides a measure of a physical parameter of the container; and using the second set of data in said calculating step to compensate for any variance of the physical parameter of the container.

11. The method of claim 10, wherein the second set of data refer to inclination of the container from a normal position.

12. A method of deriving a measurement function for measuring and monitoring the volume of liquid in a container of unknown shape and capacity, said method comprising the steps of:

iteratively adding a known volume of liquid beginning with an empty container;

collecting data from strain gauge readings after each addition of a known quantity of liquid and storing the data; and deriving a measurement function from the collected data to correlate strain gauge readings to the volume of liquid in the container.

13. The method of claim 12, further comprising a step of collecting a second set of data from a sensor which detects variances in the physical orientation of the container and deriving a compensating function from the second set of data to compensate the measurement function to account for such variances.

14. A device for measuring and monitoring the volume of a liquid in a vehicle tank, said device comprising:

a mounting adapter for mounting said device in a top wall of the tank;

an S-type beam attached to said adapter;

a pair of strain gauges mounted on opposite sides of said beam;

a longitudinal buoyant element with one end affixed to said beam and a free end extending into the tank, said buoyant element adapted to be partially submerged in a liquid in the tank such that upward and downward movement of said buoyant element registers on said strain gauges as corresponding strain measurements, said strain gauges arranged to detect vertical forces and to offset torsional and lateral forces on said buoyant element due to movement of the liquid in the tank;

a processor coupled to said strain gauges for correlating strain measurements by said strain gauges to the volume of liquid in the tank; and an output component coupled to said processor for indicating the measured volume of liquid in the container.

15. The device of claim 14, further comprising:

a sensor for detecting a physical variance of the container, said sensor coupled to said processor, wherein said processor comprises a compensator for compensating the measured volume for any physical variance of the container.

16. The device of claim 15, wherein said sensor comprises a clinometer for detecting changes in inclination.

17. The device of claim 14, further comprising:

a protective jacket covering at least a submerged portion of said float to protect said float from turbulent movement of the liquid in the container.

18. The device of claim 17, wherein said protective jacket is attached to said adapter and extends around said float in a concentric manner.

19. The device of claim 18, wherein said float and said protective jacket have a cylindrical configuration.

* * * * *